United States Patent
Mouri et al.

(10) Patent No.: US 10,094,528 B2
(45) Date of Patent: Oct. 9, 2018

(54) VEHICLE LAMP

(71) Applicants: Fumihiko Mouri, Owariasahi (JP); Takayuki Yagi, Shizuoka (JP); Yoshiyuki Nakanishi, Shizuoka (JP)

(72) Inventors: Fumihiko Mouri, Owariasahi (JP); Takayuki Yagi, Shizuoka (JP); Yoshiyuki Nakanishi, Shizuoka (JP)

(73) Assignees: TOYOTA JIDOSHA KABUSHIKI KAISHA, Toyota (JP); KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 15/220,108

(22) Filed: Jul. 26, 2016

(65) Prior Publication Data
US 2017/0067613 A1 Mar. 9, 2017

(30) Foreign Application Priority Data
Sep. 7, 2015 (JP) .................................. 2015-175944

(51) Int. Cl.
*G02B 26/08* (2006.01)
*F21S 41/675* (2018.01)
(Continued)

(52) U.S. Cl.
CPC ........... *F21S 41/675* (2018.01); *F21S 41/147* (2018.01); *F21S 41/26* (2018.01); *F21S 41/27* (2018.01);
(Continued)

(58) Field of Classification Search
CPC .......................... F21S 48/1159; F21S 48/1388
See application file for complete search history.

(56) References Cited

U.S. PATENT DOCUMENTS

2005/0162861 A1 7/2005 Yamamura et al.
2007/0268717 A1* 11/2007 Iwasaki ............... F21S 48/1388
362/539
(Continued)

FOREIGN PATENT DOCUMENTS

| CN | 103672658 A | 3/2014 | |
|---|---|---|---|
| JP | 2005-235731 A | 9/2005 | |
| JP | 2011-222238 A | 11/2011 | |
| JP | 2015-123855 A | 7/2015 | |
| JP | 2016-091976 | * 5/2016 | ................ F21S 8/12 |

OTHER PUBLICATIONS

Machine translation of JP 2016-091976 into English.*
(Continued)

*Primary Examiner* — Anh Mai
*Assistant Examiner* — Zachary J Snyder
(74) *Attorney, Agent, or Firm* — Oliff PLC

(57) ABSTRACT

A high beam unit 12 includes: a reflective mirror 30 having a reflective surface 32 that reflects light from a light source 44; a mirror member 58 on which the light reflected by the reflective surface 32 is incident which is capable of forming plural light distribution patterns, and which reflects the incident light in a vehicle forward direction; a lens 16 on which the light reflected by the mirror member 58 is incident and which projects that light in the vehicle forward direction; and a lens holding member 20 that is formed integrally with the reflective mirror 30 and supports the lens 16 in a support position P0 including a section of, or a section in a vicinity of, an outer peripheral portion of the lens 16 positioned on a plane orthogonal to the optical axis and passing through a center of gravity G.

9 Claims, 3 Drawing Sheets

(51) Int. Cl.
  *F21S 8/10* (2006.01)
  *F21S 41/147* (2018.01)
  *F21S 41/27* (2018.01)
  *F21S 41/26* (2018.01)
  *F21S 41/29* (2018.01)
  *F21S 41/39* (2018.01)
  *F21S 41/36* (2018.01)
  *F21S 41/32* (2018.01)

(52) U.S. Cl.
  CPC ........... *F21S 41/295* (2018.01); *F21S 41/321* (2018.01); *F21S 41/36* (2018.01); *F21S 41/39* (2018.01); *F21S 48/1159* (2013.01); *F21S 48/1216* (2013.01); *F21S 48/1266* (2013.01); *F21S 48/1291* (2013.01); *F21S 48/1305* (2013.01); *F21S 48/1323* (2013.01); *F21S 48/1388* (2013.01); *F21S 48/1757* (2013.01); *G02B 26/0833* (2013.01)

(56) References Cited

U.S. PATENT DOCUMENTS

2008/0144329 A1\* 6/2008 Okuda ............... B60Q 1/076
  362/539
2011/0249460 A1 10/2011 Kushimoto
2014/0071706 A1\* 3/2014 Yagi .................. F21S 48/125
  362/520
2015/0124466 A1 5/2015 Kushimoto

OTHER PUBLICATIONS

Select pages (title page, publication information, pp. 188 and 212) from Opto-Mechanical Systems Design, Fourth Edition, vol. 1. by Paul Yoder, published Mar. 19, 2015.\*

\* cited by examiner

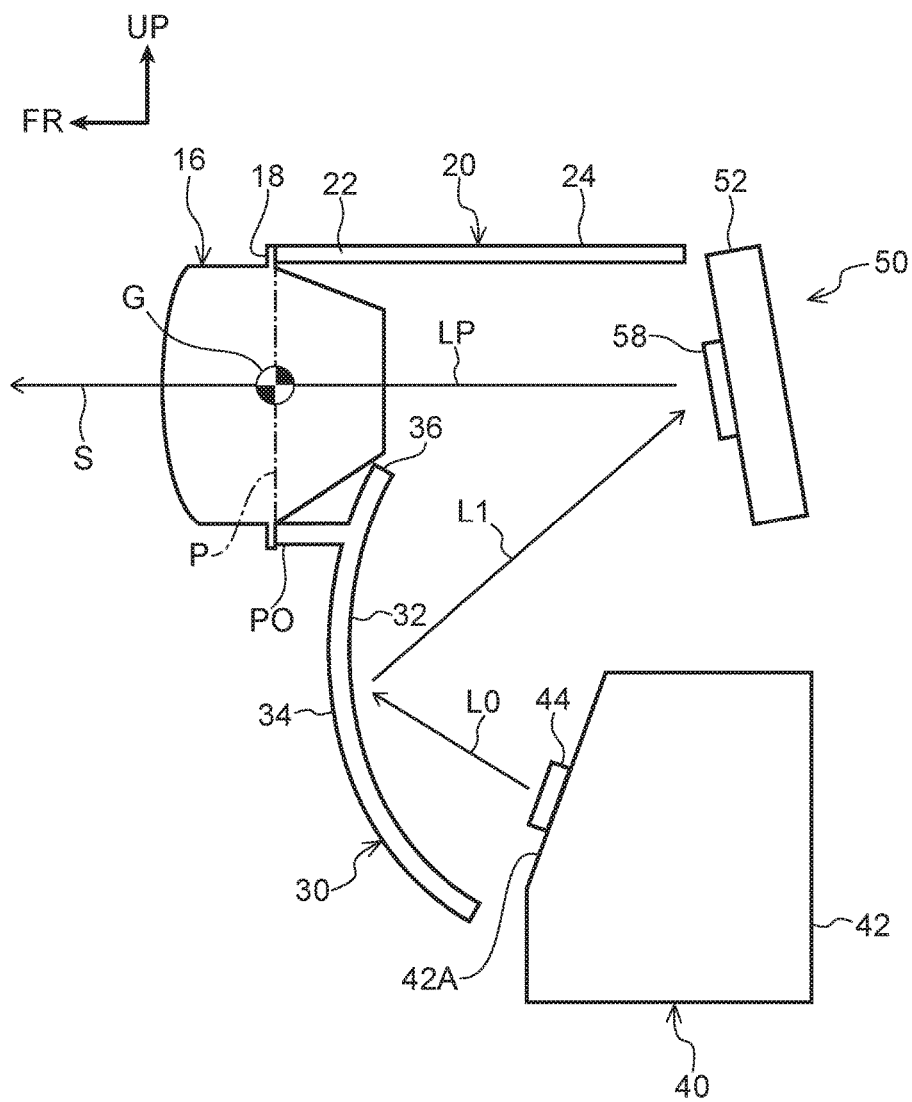

VEHICLE LAMP

CROSS-REFERENCE TO RELATED APPLICATION

This application claims priority under 35 USC 119 from Japanese Patent Application No. 2015-175944 filed on Sep. 7, 2015, the disclosure of which is incorporated by reference herein.

BACKGROUND

Technical Field

The present invention relates to a vehicle lamp used in a vehicle.

Related Art

In recent years, vehicle lamps capable of forming plural light distribution patterns have been proposed. For example, Japanese Patent Application Laid-open (JP-A) No. 2015-123855 discloses a vehicle lamp that reflects, by means of a reflective mirror, light from a light source, causes the reflected light to be made incident on a pixel projector, and projects diffuse light in the vehicle forward direction via a projector lens. A microelectromechanical system (MEMS) mirror array is used as the pixel projector in JP-A No. 2015-123855, and the MEMS mirror array forms a desired light distribution pattern.

In this connection, when configuring a vehicle lamp by adding a MEMS mirror array, which is a high-resolution optical element, to conventional optical parts (light source, reflective mirror, projector lens, etc.), it is necessary to ensure positional precision between the optical parts. Furthermore, the need to control shifting of the lens at the time of vibrational input to the vehicle also arises.

SUMMARY OF THE INVENTION

In consideration of the circumstances described above, it is an object of the present invention to obtain a vehicle lamp with which positional precision between optical parts can be easily ensured and shifting of the lens with respect to vibrational input can be controlled.

In order to achieve this object, a vehicle lamp according to a first aspect of the present invention includes: a light source; a reflective mirror having a reflective surface that reflects light from the light source; a mirror member on which the light reflected by the reflective mirror is incident, which is capable of forming plural light distribution patterns, and which reflects the incident light in the vehicle forward direction; a lens on which the light reflected by the mirror member is incident and which projects the light in a vehicle forward direction; and a lens holding member that is formed integrally with the reflective mirror and that supports the lens at a support position including a section, or a section in a vicinity of, an outer peripheral portion of the lens positioned on a plane orthogonal to an optical axis of the lens and passing through a center of gravity of the lens.

In the vehicle lamp according to the first aspect, the lens holding member and the reflective mirror are integrally formed, and the lens holding member and the reflective mirror are already positioned relative to each other. Consequently, the lens that is held by the lens holding member and the reflective mirror can be easily positioned relative to each other. Additionally, by positioning the light source and the reflective mirror relative to each other and positioning the light source and the mirror member relative to each other once the lens and the reflective mirror are positioned relative to each other, positional precision can be easily ensured in regard to the lens, the reflective mirror, the light source, and the mirror member overall, which are optical parts.

Furthermore, the lens holding member holds the lens in the support position including the section of, or a section in a vicinity of, an outer peripheral portion of the lens positioned on the plane orthogonal to the optical axis of the lens and passing through the center of gravity of the lens. Here, "vicinity" refers to a position 5 mm or less in the vehicle forward and rearward direction from the section of the outer peripheral portion of the lens positioned on the plane orthogonal to the optical axis of the lens and passing through the center of gravity of the lens. By holding the lens in the support position, shifting of the lens can be controlled.

A vehicle lamp according to a second aspect of the present invention is the invention of the first aspect, wherein the lens holding member is formed in a shape of a tube along the outer peripheral portion of the lens, and at least part of the lens is housed inside the tube of the lens holding member.

In the vehicle lamp according to the second aspect, at least part of the lens is housed inside the tube of the lens holding member, so the lens can be stably held.

A vehicle lamp according to a third aspect of the present invention is the invention relating to the first or second aspect, wherein the reflective mirror is disposed between the light source and the lens, and the lens holding member is formed integrally with a region of the reflective mirror at an opposite side from the light source.

In the vehicle lamp according to the third aspect, the lens holding member is formed on the side of the reflective mirror opposite the light source side, so the lens holding member can be formed without obstructing the reflection of light on the reflective surface of the reflective mirror.

A vehicle lamp according to a fourth aspect of the present invention is the invention relating to the third aspect, wherein an end portion of the reflective mirror at a side of the lens is disposed further toward a side of the optical axis of the lens than the support position.

In the vehicle lamp according to the fourth aspect, in the support position the end portion of the reflective mirror coincides with the lens, so the light from the light source can be kept from being made incident directly on the lens.

A vehicle lamp according to a fifth aspect of the present invention is the invention relating to any one of the first to fourth aspects, wherein at least part of the reflective mirror overlaps the lens in an optical axis direction of the lens.

In the vehicle lamp pertaining to the fifth aspect, the reflective mirror and the lens overlap each other in the optical axis direction of the lens, so the area where the optical parts are installed can be reduced.

A vehicle lamp pertaining to a sixth aspect of the present invention is the invention pertaining to any one of the first to fifth aspects, wherein the mirror member is a MEMS mirror array.

In the vehicle lamp pertaining to the sixth aspect, a MEMS mirror array is used as the mirror member, so plural light distribution patterns can be easily formed.

According to the vehicle lamp pertaining to the first aspect of the present invention, positional precision between the optical parts configuring the vehicle lamp can be easily ensured and shifting of the lens can be controlled.

According to the vehicle lamp pertaining to the second aspect of the present invention, the lens can be stably held by the lens holding member.

According to the vehicle lamp pertaining to the third aspect of the present invention, the lens holding member does not obstruct the reflection of the light on the reflective surface of the reflective mirror, so the degree of freedom of the design of the lens holding member can be enhanced.

According to the vehicle lamp pertaining to the fourth aspect of the present invention, stray light from the light source can be kept from affecting the light distribution pattern formed by the mirror member.

In the vehicle lamp pertaining to the fifth aspect of the present invention, by reducing the area where the reflective mirror and the lens are installed, the vehicle lamp can be given a compact configuration.

According to the vehicle lamp pertaining to the sixth aspect of the present invention, various light distribution patterns can be formed by the MEMS mirror array.

BRIEF DESCRIPTION OF THE DRAWINGS

An embodiment of the present invention will be described in detail based on the following figures, wherein:

FIG. 3 is a schematic configuration diagram showing the high beam unit pertaining to the embodiment as seen from the side.

DETAILED DESCRIPTION OF THE INVENTION

Figure 1:
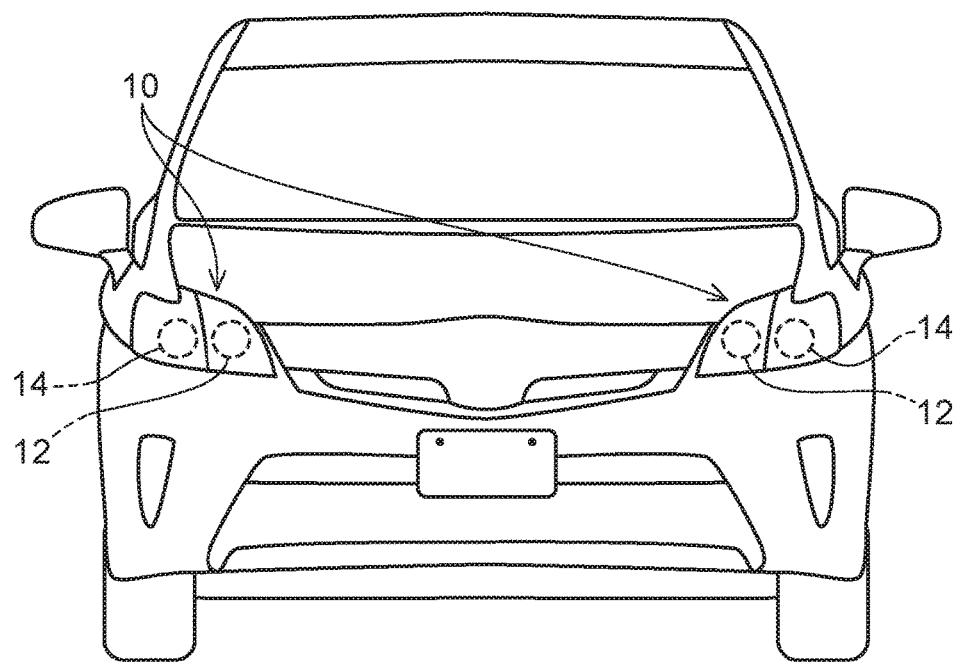
FIG. 1 is a front view of a vehicle equipped with a high beam unit pertaining to the embodiment.

An embodiment of a vehicle lamp pertaining to the present invention will be described below with reference to the drawings. Arrow UP appropriately shown in the drawings indicates a vehicle body upward direction, arrow FR indicates a vehicle body forward direction, and arrow W indicates a vehicle width direction.

As shown in FIG. 1, a pair of headlamp units 10 are placed on both vehicle width direction sides of the front of a vehicle. The pair of headlamp units 10 are each equipped with a high beam unit 12 and a low beam unit 14. In the present embodiment, an example where the vehicle lamp of the present invention is applied to the high beam unit 12 is described.

Figure 2:
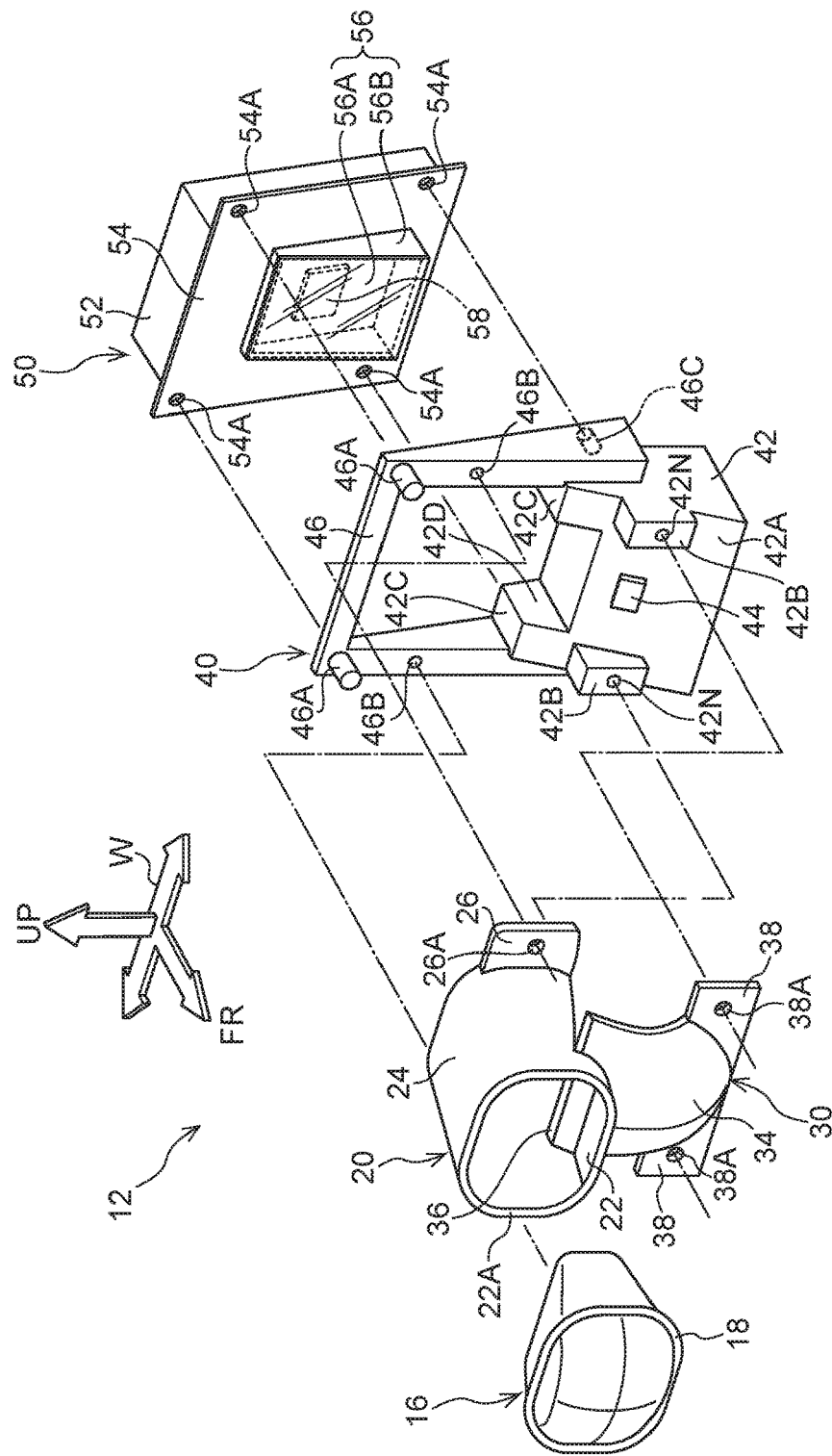
FIG. 2 is an exploded perspective view of the high beam unit pertaining to the embodiment.

As shown in FIG. 2, the high beam unit 12 is equipped with a lens 16, a lens holding member 20, a reflective mirror 30, a light source unit 40, and a mirror unit 50.

The lens 16 is a so-called projector lens. In FIG. 3, S denotes the optical axis and the optical axis direction of the lens 16 and G denotes the center of gravity of the lens 16. A flange portion 18 is formed on the outer peripheral portion of the lens 16 in a position on a plane P orthogonal to the optical axis direction S and including the center of gravity G. The flange portion 18 is formed in the shape of a loop that projects outward from the outer periphery of the lens 16.

The lens holding member 20 has a tube body portion 22 shaped like a tube and an upper cover portion 24 placed on the rear side of the tube body portion 22. A front end portion 22A of the tube body portion 22 is secured to the flange portion 18 of the lens 16. This securement can be performed by welding, for example. Because of this, the part of the lens 16 on the rear side of the flange portion 18 is housed inside the tube body portion 22, and the lens 16 is supported by the lens holding member 20 in a support position P0 on the plane P including the center of gravity G.

It should be noted that the flange portion 18 may also be formed in a position (a neighboring position) 5 mm or less in the vehicle forward and rearward direction from the position on the plane P including the center of gravity G, and this neighboring position may serve as the support position. Furthermore, the welding between the flange portion 18 and the front end portion 22A of the tube body portion 22 may be performed along the entire periphery or may be performed in about three spots.

The upper cover portion 24 has a shape where the section of the tube body portion 22 excluding its lower portion extends rearward. The part of the tube body portion 22 on the lower side of the upper cover portion 24 is cut out, so that the upper cover portion 24 is shaped like an inverted U when seen from its rear side in the optical axis direction S.

Holding and attachment portions 26 that become attached to the light source unit 40 are formed on the rear side of the side surfaces of the upper cover portion 24. The holding and attachment portions 26 are each shaped like a plate whose plate thickness direction coincides with the optical axis direction S, and the holding and attachment portions 26 project from the side surfaces of the upper cover portion 24. The holding and attachment portions 26 are formed as a right and left pair, and a screw hole 26A is formed in each of the holding and attachment portions 26.

The reflective mirror 30 is formed integrally with the lens holding member 20 on the lower side of the lens holding member 20. As shown in FIG. 3, the reflective mirror 30 has a reflective surface 32 that reflects in the vehicle rearward direction light L0 from a later-described light source 44. The reflective surface 32 is a concave spherical mirror and causes the reflected light to be made incident on a mirror member 58 on the rear side of the reflective mirror 30. A reflective reverse surface 34 is formed on the side of the reflective mirror 30 opposite the reflective surface 32 side. Mirror attachment portions 38 are formed on the rightward and leftward direction lower side of the reflective mirror 30. The mirror attachment portions 38 are formed as a right and left pair, and a screw hole 38A is formed in each of the mirror attachment portions 38 (see FIG. 2). The lower portion of the tube body portion 22 is connected to the upper side of the reflective reverse surface 34. The lens holding member 20 and the reflective mirror 30 are made of resin so that they can be integrally formed using a mold or the like.

The reflective mirror 30 is placed in a position away from the optical axis S of the lens 16 and between the later-described light source 44 and the lens 16. An upper end portion 36 of the reflective mirror 30 is placed on the upper side (the lens 16 optical axis S side) of the support position P0, and part of the lower side of the lens 16 coincides with the reflective mirror 30 as seen from the optical axis direction S of the lens 16. Moreover, at least part of the reflective mirror 30 overlaps the lens 16 in the optical axis direction S of the lens 16 (as seen from the side of the tube body portion 22).

As shown in FIG. 2, the light source unit 40 is placed on the vehicle rear side of the reflective mirror 30 and is equipped with a base portion 42, a light source 44, and an attachment frame 46. It should be noted that FIG. 3 shows only the base portion 42 and the light source 44 of the light source unit 40 and does not show other members. A light source placement surface 42A that faces obliquely forward and upward is formed on the front side of the base portion 42. The light source 44 is placed on the light source placement surface 42A and emits light toward the reflective surface 32. A high-intensity light source such as a light emitting diode (LED), a laser diode (LD), a halogen lamp, or a high-intensity discharge (HID) lamp can be used for the light source 44.

A pair of attachment ribs 42B are formed on both the right and left sides of the light source placement surface 42A. The attachment ribs 42B project forward from the light source placement surface 42A, and screw holes 42N are formed in the attachment ribs 42B in positions corresponding to the screw holes 38A. Female threads are formed in the screw holes 42N. A pair of right and left ribs 42C are formed on the upper portion of the base portion 42. The ribs 42C project upward, and a recess portion 42D is formed between the pair of ribs 42C.

The attachment frame 46 is shaped like an inverted U as seen in a plan view and is placed on the base portion 42 with the open side of the U facing the base portion 42. The attachment frame 46 and the base portion 42 can be integrally formed of resin or the like. The attachment frame 46 is attached in such a way that the ribs 42C of the base portion 42 are sandwiched inside the distal ends of the U. The rear surface of the attachment frame 46 slopes obliquely rearward and upward. The angle of inclination thereof corresponds to the angle of inclination of the later-described mirror member 58 and is set in such a way that the light reflected by the mirror member 58 is appropriately made incident on the lens 16. Female screw portions 46A for screwing screws from the rear direction are formed on both the right and left sides of the upper end of the attachment frame 46. Furthermore, a pair of screw holes 46B for screwing screws from the front direction are formed on the lower side of the female screw portions 46A in positions corresponding to the screw holes 26A. Female threads are formed in the screw holes 46B. Moreover, female screw portions 46C for screwing screws from the rear direction are formed on the lower side of the screw holes 46B.

The lens holding unit 20 and the light source unit 40 are secured to each other by putting together the rear surfaces of the holding and attachment portions 26 and the front surface of the attachment frame 46, inserting screws (not shown in the drawings) into the screw holes 26A from the front direction, and screwing the screws into the screw holes 46B. Furthermore, the reflective mirror 30 and the light source unit 40 are secured to each other by putting together the rear surfaces of the mirror attachment portions 38 and the attachment ribs 42B, inserting screws (not shown in the drawings) into the screw holes 38A from the front direction, and screwing the screws into the screw holes 42N.

The mirror unit 50 is placed on the vehicle rear side on the optical axis S of the lens 16 and is equipped with a base 52, an attachment plate 54, a cover member 56, and a mirror member 58. It should be noted that FIG. 3 shows only the base 52 and the mirror member 58 of the mirror unit 50 and does not show other members. The attachment plate 54 is placed on the front portion of the base 52. The attachment plate 54 is shaped like a square plate and covers the front portion of the base 52. The outer dimension of the attachment plate 54 is larger than that of the base 52, and screw holes 54A are formed in the four corners of the sections of the attachment plate 54 that stick out from the base 52.

The mirror member 58 is placed in the central portion of the attachment plate 54. The mirror member 58 is configured by a MEMS mirror array. The MEMS mirror array has plural micro movable mirrors that are two-dimensionally arrayed. Each of the plural micro movable mirrors is formed on a semiconductor substrate by a semiconductor process. Light made incident on the MEMS mirror array is reflected by the plural micro movable mirrors. Each of the plural micro movable mirrors is switched to an ON state or an OFF state as a result of being independently driven to change the angle of its reflective surface by control of a control unit (not shown in the drawings). Light reflected by micro movable mirrors in the ON state is made incident on the lens 16 placed on the vehicle front side of the mirror member 58. Light reflected by micro movable mirrors in the OFF state is projected onto a light absorber (not shown in the drawings). The light absorber absorbs the projected light. Light according to a predetermined light distribution pattern is made incident on the lens 16, and the light distribution pattern is projected in the forward direction of the vehicle.

It should be noted that the light distribution pattern formed by the mirror member 58 may be a light distribution pattern formed on the basis of sensing results obtained by sensors or the like sensing the area around the vehicle, or may be a prerecorded light distribution pattern.

The cover member 56 is placed on the outside of the mirror member 58. The cover member 56 is equipped with a clear light-transmitting plate 56A, which is placed on the front side of the mirror member 58, and a frame plate 56B, which is placed on the outer periphery of the mirror member 58. The cover member 56 keeps the mirror member 58 from being exposed to the outside and prevents dust and so forth from sticking to the mirror member 58.

The mirror unit 50 and the light source unit 40 are attached to each other by putting together the rear surface of the attachment frame 46 and the front surface of the attachment plate 54, inserting screws (not shown in the drawings) into the screw holes 54A from the rear direction, and screwing the screws into the female screw portions 46A and the female screw portions 46C. The reflective surface of the mirror member 58 slopes in the same direction as the rear surface of the attachment frame 46.

Next, the projection of the light by the high beam unit 12 will be described. Light L0 emitted from the light source 44 toward the reflective surface 32 of the reflective mirror 30 is reflected by the reflective surface 32 of the reflective mirror 30, and reflected light L1 is made incident on the mirror member 58. The light made incident on the mirror member 58 is reflected in accordance with the ON/OFF states of each of the micro movable mirrors, and a predetermined light distribution pattern LP is made incident on the lens 16. Then, the light distribution pattern LP is projected via the lens 16 in the forward direction of the vehicle.

In the high beam unit 12 of the present embodiment, a desired light distribution pattern can be formed and projected in the forward direction of the vehicle by the mirror member 58 which uses a MEMS mirror array. In the high beam unit 12, high positional precision is required for the positional relationship between the lens 16, the reflective mirror 30, the light source unit 40, and the mirror unit 50. In this respect, in the present embodiment, the lens holding member 20 that holds the lens 16 and the reflective mirror 30 are integrally formed, so by precisely attaching the lens 16 to the lens holding member 20, the lens 16 and the reflective mirror 30 can be easily positioned relative to each other.

Additionally, by positioning the light source unit 40 and the reflective mirror 30 relative to each other and positioning the light source unit 40 and the mirror unit 50 relative to each other once the lens 16 and the reflective mirror 30 are positioned relative to each other, positioning can be performed in regard to the lens 16, the reflective mirror 30, the light source unit 40, and the mirror unit 50 overall, which are optical parts. Because of this, positional precision between the optical parts can be easily ensured.

Furthermore, in the high beam unit 12 of the present embodiment, the lens holding member 20 holds the lens 16 in the support position P0 on the plane P including the center of gravity G of the lens 16, so shifting of the lens 16 with respect to vibrational input to the vehicle can be controlled.

Furthermore, in the high beam unit 12 of the present embodiment, the reflective mirror 30 is placed between the light source 44 and the lens 16, and the lower portion of the lens holding member 20 (the tube body portion 22) is connected to the upper side of the reflective reverse surface 34. Consequently, the lens holding member 20 is prevented from obstructing the reflection of light on the reflective surface 32 of the reflective mirror 30, and the degree of freedom of the design of the lens holding member 20 can be enhanced.

Furthermore, the upper end portion 36 of the reflective mirror 30 is placed on the lens 16 optical axis side of the support position P0, and part of the lower side of the lens 16 coincides with the reflective mirror 30 as seen from the optical axis direction S of the lens 16. Consequently, stray light from the light source 44 that does not contribute to the light distribution pattern is kept from being made incident on the lens 16 and can be kept from affecting the light distribution pattern formed by the mirror member 58.

Furthermore, at least part of the reflective mirror 30 overlaps the lens 16 in the optical axis direction S of the lens 16. Consequently, the area where the reflective mirror 30 and the lens 16 are installed can be reduced and the high beam unit 12 can be given a compact configuration.

It should be noted that, although in the present embodiment the reflective mirror 30 is placed on the lower side of the lens holding member 20, the position of the reflective mirror 30 may also be on the upper side of the lens holding member 20 or may also be on the right side or the left side.

Furthermore, in the present embodiment, the vehicle lamp pertaining to the present invention is applied to the high beam unit 12, but the vehicle lamp pertaining to the present invention may also be applied to the low beam unit 14.

Furthermore, in the present embodiment, an example using a MEMS mirror array as the mirror member was described, but another reflective member capable of forming plural light distribution patterns, such as liquid crystal on silicon (LCOS), for example, may also be used as the mirror member.

What is claimed is:

1. A vehicle lamp, comprising:
a light source;
a reflective mirror having a reflective surface that reflects light from the light source;
a mirror member on which the light reflected by the reflective mirror is incident, which is capable of forming plural light distribution patterns, and which reflects the incident light in a vehicle forward direction;
a lens on which the light reflected by the mirror member is incident and which projects the light in the vehicle forward direction, the lens having a mounting surface at an outer periphery of the lens, the mounting surface facing in a vehicle rearward direction, the mounting surface located on a plane orthogonal to an optical axis of the lens and located at, or in a vicinity of, a center of gravity of the lens relative to a direction in which the optical axis of the lens extends, so that a front portion of the lens extends forward of the mounting surface in the vehicle forward direction and a rear portion of the lens extends rearward of the mounting surface in the vehicle rearward direction; and
a lens holding member that is formed integrally with the reflective mirror and has a front end portion that is attached to the mounting surface and supports the lens at a support position included on the plane orthogonal to the optical axis of the lens and passing through, or in the vicinity of, the center of gravity of the lens.

2. The vehicle lamp according to claim 1, wherein:
the lens holding member is formed in a shape of a tube along the outer peripheral portion of the lens, and
at least part of the lens is housed inside the tube of the lens holding member.

3. The vehicle lamp according to claim 1, wherein:
the reflective mirror is disposed between the light source and the lens, and
the lens holding member is formed integrally with a region of the reflective mirror at an opposite side from the light source.

4. The vehicle lamp according to claim 3, wherein an end portion of the reflective surface of the reflective mirror at a side of the lens is disposed further toward a side of the optical axis of the lens than the support position.

5. The vehicle lamp according to claim 1, wherein at least part of the reflective mirror overlaps the lens in an optical axis direction of the lens.

6. The vehicle lamp according to claim 1, wherein the mirror member comprises a MEMS mirror array.

7. A vehicle lamp, comprising:
a light source;
a reflective mirror having a reflective surface that reflects light from the light source;
a mirror member on which the light reflected by the reflective mirror is incident, which is capable of forming plural light distribution patterns, and which reflects the incident light in a vehicle forward direction;
a lens on which the light reflected by the mirror member is incident and which projects the light in the vehicle forward direction; and
a lens holding member that is formed integrally with the reflective mirror and that supports the lens at a support position including a section of, or a section in a vicinity of, an outer peripheral portion of the lens positioned on a plane orthogonal to an optical axis of the lens, wherein
the reflective mirror is disposed between the light source and the lens,
the lens holding member is formed integrally with a region of the reflective mirror at an opposite side from the light source,
an end portion of the reflective surface of the reflective mirror at a side of the lens is disposed further toward a side of the optical axis of the lens than the support position, and
at least part of the reflective mirror overlaps the lens in an optical axis direction of the lens.

8. The vehicle lamp according to claim 7, wherein:
the lens holding member is formed in a shape of a tube along the outer peripheral portion of the lens, and
at least part of the lens is housed inside the tube of the lens holding member.

9. The vehicle lamp according to claim 7, wherein the mirror member comprises a MEMS mirror array.

* * * * *